United States Patent
Li et al.

(10) Patent No.: US 11,996,765 B2
(45) Date of Patent: May 28, 2024

(54) CURRENT LIMIT CONTROL CIRCUIT AND SWITCHED-MODE POWER SUPPLY CHIP INCORPORATING SAME

(71) Applicant: SHANGHAI XINLONG SEMICONDUCTOR TECHNOLOGY CO., LTD., Shanghai (CN)

(72) Inventors: Ruiping Li, Shanghai (CN); Jinlong Xu, Shanghai (CN); Bin Liu, Shanghai (CN); Wei Chi, Shanghai (CN)

(73) Assignee: SHANGHAI XINLONG SEMICONDUCTOR TECHNOLOGY CO., LTD, Shanghai (CN)

( * ) Notice: Subject to any disclaimer, the term of this patent is extended or adjusted under 35 U.S.C. 154(b) by 259 days.

(21) Appl. No.: 17/623,082

(22) PCT Filed: Jul. 9, 2021

(86) PCT No.: PCT/CN2021/105516
§ 371 (c)(1),
(2) Date: Dec. 27, 2021

(87) PCT Pub. No.: WO2021/254527
PCT Pub. Date: Dec. 23, 2021

(65) Prior Publication Data
US 2022/0263403 A1    Aug. 18, 2022

(30) Foreign Application Priority Data
Jan. 15, 2021   (CN) .......................... 202110051763.9

(51) Int. Cl.
*H02M 1/32*    (2007.01)
*H02M 1/00*    (2006.01)
*H02M 3/156*   (2006.01)

(52) U.S. Cl.
CPC ........... *H02M 1/32* (2013.01); *H02M 1/0009* (2021.05); *H02M 3/156* (2013.01)

(58) Field of Classification Search
CPC ...... H02M 1/32; H02M 1/322; H02M 1/0009; H02M 3/156
See application file for complete search history.

(56) References Cited

U.S. PATENT DOCUMENTS

| | | | | |
|---|---|---|---|---|
| 2002/0140408 A1* | 10/2002 | Hwang | ................. | H02M 3/156 323/224 |
| 2011/0279930 A1* | 11/2011 | Lin | ......................... | H02M 1/32 361/18 |
| 2019/0146569 A1* | 5/2019 | Nge | ........................ | H02M 1/32 713/320 |

FOREIGN PATENT DOCUMENTS

| | | |
|---|---|---|
| CN | 101719723 A | 6/2010 |
| CN | 103490396 A | 1/2014 |

(Continued)

OTHER PUBLICATIONS

International Search Report, China National Intellectual Property Administration, Application No. PCT/CN2021/105516, dated Sep. 22, 2021, 4 pages.

*Primary Examiner* — Kyle J Moody
*Assistant Examiner* — Jye-June Lee
(74) *Attorney, Agent, or Firm* — Ziegler IP Law Group (57) ABSTRACT

A current limit control circuit and a switched-mode power supply chip incorporating the current limit control circuit are disclosed. The current limit control circuit includes an output current sampling module, a first voltage comparator module, a hysteresis comparator module, a logic control module, a capacitor charging/discharging module and a current limit control module. The capacitor charging/discharging module is configured to charge/discharge a capacitor and thus change its output voltage, and the hysteresis (Continued)

comparator module is configured to produce a current limit control signal which allows the switched-mode power supply to output a high current for a specified period of time. Upon elapse of the period, the power transistor is controlled to cause a low current to be output. This ensures that the demand of a load for a transient current is satisfied while ensuring safe and stable operation of the chip for a long time.

10 Claims, 5 Drawing Sheets

(56) References Cited

FOREIGN PATENT DOCUMENTS

| | | |
|---|---|---|
| CN | 108123529 A | 6/2018 |
| CN | 112383216 A | 2/2021 |
| JP | 2011189768 A | 9/2011 |

* cited by examiner

Fig. 5

CURRENT LIMIT CONTROL CIRCUIT AND SWITCHED-MODE POWER SUPPLY CHIP INCORPORATING SAME

TECHNICAL FIELD

The present invention relates to the field of switched-mode power supplies, and more particular to a current limit control circuit and a switched-mode power supply chip incorporating the current limit control circuit.

BACKGROUND

In the field of power supplies, in order to ensure safe and stable operation, power supplies are all equipped with current limiting members for preventing short circuits, which are typically accompanied by overload output currents that may cause thermal runaway and possible damage to a connected chip. In order to overcome this problem, many power supply chips are configured with fixed current limits. However, in some applications, such fixed current limits are not a good choice.

For example, if we need a power supply for driving a GPRS module, which operates at a very small current when not transmitting a signal, but requires a relatively large transient current to transmit a signal. Although this transient current does not last for a long time, its implementation imposes stricter requirements on the power supply.
1. If it is configured with a too low current limit, a current surge required to transmit a signal readily tends to pull an output voltage to such a low level that may not allow normal operation of the GPRS module.
2. If it is configured with a too high current limit, then in the event of an accidental short circuit occurring at the output, the chip itself and associated peripheral devices may be all subject to great stress. When this occurs, if the chip or any peripheral device is designed with an insufficient margin, failure of the whole system may take place. However, increasing the margins of the chip and the peripheral devices may lead to a waste of resources and increased cost. In some cases, increasing the margins may be impossible because there is not sufficient room in the product package to house larger components.
3. The transient current may last for several milliseconds, and in this case, it may be conveniently provided by a general output capacitor. However, when it lasts for a longer time such as several seconds, a very large output capacitance typically of several farads may be required to be provided by a supercapacitor which is extremely costly and bulky. Moreover, an excessive output capacitance may bring a huge challenge to the system's loop stability design.

These problems are also found in other applications involving a large transient current, such as the startup of a boost-type circuit, driving of a contactor, and signal transmission of a WiFi module.

SUMMARY OF THE INVENTION

In order to overcome the above-described drawbacks of the prior art, the present invention provides a current limit control circuit and a switched-mode power supply chip incorporating the current limit control circuit, which is capable of outputting a high current lasting for a specified period of time and operating under a condition with a low current limit in the remaining time, thus meeting the need of a load for the transient current while ensuring safe and stable operation of the chip.

To this end, in embodiments of the present invention, there is provided a current limit control circuit including an output current sampling module, a first voltage comparator module, a hysteresis comparator module, a logic control module, a capacitor charging/discharging module and a current limit control module, the output current sampling module configured to detect the magnitude of an output current and output a corresponding sampled voltage signal, the first voltage comparator module configured to compare the sampled voltage signal with a first reference voltage signal and output a first comparison signal, the first reference voltage signal serving as a low/high current threshold voltage signal, the hysteresis comparator module configured to compare an output voltage of a capacitor with upper and lower threshold limits of the hysteresis comparator element and output a second comparison signal, the logic control module configured to output a logic control signal based on the first and second comparison signals, the capacitor charging/discharging module configured to adjust the capacitor's output voltage based on the logic control signal, the current limit control module configured to output a current limit control signal based on the logic control signal.

If the capacitor's output voltage is lower than the lower threshold limit of the hysteresis comparator element and if the sampled voltage signal is higher than the first reference voltage signal, the capacitor charging/discharging module charges the capacitor so that the capacitor's output voltage is raised, and the current limit control signal allows a high current to be output. If the capacitor's output voltage further rises to a level lower than the upper threshold limit of the hysteresis comparator element and higher than the lower threshold limit of the hysteresis comparator element and if the sampled voltage signal is higher than the first reference voltage signal, the capacitor continues being charged so that its output voltage is further raised and the current limit control signal still allows the high current to be output. If the capacitor's output voltage rises above the upper threshold limit of the hysteresis comparator element, the capacitor is discharged so that its output voltage is lowered, and the current limit control signal allows the output current to become low. If the capacitor's output voltage further drops below the upper threshold limit of the hysteresis comparator element, the capacitor continues being discharged so that its output voltage further decreases but is higher than the lower threshold limit of the hysteresis comparator element, and the current limit control signal still allows the low current to be output.

Optionally, the output current sampling module may include a first resistor, a second resistor, a third resistor, a fourth resistor and an operational amplifier, the operational amplifier having a positive power supply terminal coupled to a power supply voltage, the operational amplifier having a grounded negative power supply terminal, one end of the first resistor serving as a second current sampling pin and coupled to one end of a current sampling resistor, the other end of the first resistor coupled to both one end of the second resistor and an inverting input terminal of the operational amplifier, one end of the fourth resistor grounded, the other end of the fourth resistor coupled to both one end of the third resistor and a non-inverting input terminal of the operational amplifier, the other end of the third resistor serving as a first current sampling pin and coupled to the other end of the current sampling resistor, the operational amplifier having an output terminal coupled to the other end of the second resistor and serving as an output terminal of the output current sampling module.

Optionally, the first voltage comparator module may be implemented as a first comparator, the first comparator having an inverting input terminal coupled to the first reference voltage signal, the first comparator having a non-inverting input terminal implemented as the output terminal of the output current sampling module, the first comparator having a positive power supply terminal coupled to an operating voltage, the first comparator having a grounded negative power supply terminal, the first comparator having an output terminal serving as an output terminal of the first voltage comparator module.

Optionally, the logic control module may be implemented as a two-input NAND gate, the NAND gate having a first input terminal coupled to the output terminal of the first voltage comparator module, the NAND gate having a second input terminal coupled to an output terminal of the hysteresis comparator module, the NAND gate having an output terminal serving as an output terminal of the logic control module.

Optionally, the NAND gate may include a first PMOS transistor, a second PMOS transistor, a first NMOS transistor and a second NMOS transistor, sources of the first and second PMOS transistors both coupled to the operating voltage, drains of the first PMOS, second PMOS and first NMOS transistors coupled together and serving as the output terminal of the logic control module, gates of the first PMOS and second NMOS transistors coupled together and serving as the first input terminal of the NAND gate, the second NMOS transistor including a grounded source, the second NMOS transistor including a drain coupled to a source of the first NMOS transistor, gates of the first NMOS and second PMOS transistors coupled together and serving as the second input terminal of the NAND gate.

Optionally, the hysteresis comparator module may include a second comparator, a fifth resistor and a sixth resistor, the second comparator having an inverting input terminal coupled to an output terminal of the capacitor charging/discharging module, the second comparator having a non-inverting input terminal coupled to one end of the fifth resistor and one end of the sixth resistor, the other end of the fifth resistor coupled to a second reference voltage terminal, the other end of the sixth resistor coupled to an output terminal of the second comparator and serving as an output terminal of the hysteresis comparator module, the second comparator having a positive power supply terminal coupled to an operating voltage, the second comparator having a grounded negative power supply terminal.

Optionally, the capacitor charging/discharging module may include a first current source, a second current source, a third PMOS transistor, a third NMOS transistor and the capacitor, the first current source having an input terminal coupled to an operating voltage, the first current having an output terminal coupled to a source of a third PMOS transistor, the third PMOS transistor having a gate coupled to an output terminal of the logic control module, a drain of the third PMOS transistor, one end of the capacitor and a drain of the third NMOS transistor coupled together and serving as an output terminal of the capacitor charging/discharging module, the other end of the capacitor grounded, the third NMOS transistor having a source coupled to an input terminal of the second current source, the second current source having a grounded output terminal, the third NMOS transistor having a gate coupled to an output terminal of the logic control module.

Optionally, the current limit control module may be implemented as an error amplifier including a seventh resistor, an eighth resistor, a ninth resistor, a transconductance amplifier and a fourth NMOS transistor, one end of the seventh resistor coupled to an internal reference voltage, the other end of the seventh resistor, one end of the eighth resistor and one end of the ninth resistor coupled together and serving as a non-inverting input terminal of the transconductance amplifier, the other end of the eighth resistor coupled to a drain of the fourth NMOS transistor, both a source of the fourth NMOS transistor and the other end of the ninth resistor grounded, the fourth NMOS transistor including a gate coupled to an output terminal of the logic control module, the transconductance amplifier having an inverting input terminal implemented as an output terminal of the output current sampling module, the transconductance amplifier having a positive power supply terminal coupled to an operating voltage, the transconductance amplifier having a grounded negative power supply terminal, the transconductance amplifier having an output terminal serving as an output terminal of the current limit control module.

In embodiments of the present invention, there is also provided a switched-mode power supply chip including the current limit control circuit as defined in any of the preceding paragraphs, a voltage regulator, a power transistor and a power transistor driver, the voltage regulator configured to acquire the power supply voltage and then provide the current limit control circuit with the operating voltage and the internal reference voltage, the current limit control circuit configured to sample an output current and output the current limit control signal based on the power supply voltage, the operating voltage, the internal reference voltage, the first reference voltage terminal and the second reference voltage terminal, the power transistor driver configured to acquire the current limit control signal and a feedback signal of the output voltage and produce a power transistor drive signal by means of frequency compensation and latched driving, the power transistor configured to turn on or off the power transistor based on the power transistor drive signal and thus limit the magnitude of the output current.

Optionally, the capacitor in the current limit control circuit may be disposed outside the chip.

In summary, the present invention has the following advantages:

The current limit control circuit and switched-mode power supply chip provided in embodiments of the present invention are simple in structure and change the capacitor's output voltage through charging/discharging the capacitor. Moreover, the hysteresis comparator module allows the switched-mode power supply to output a high current for a specified period of time. Upon elapse of the period, the power transistor is controlled to cause a low current to be output. This ensures that the demand of a load for a transient current is satisfied while ensuring safe and stable operation of the chip.

These and other objects, features and advantages of the present invention will become apparent from the following detailed description of preferred embodiments thereof, which is to be read in connection with the accompanying drawings.

DETAILED DESCRIPTION

The present invention will be described in greater detail below with reference to specific embodiments thereof so that those skilled in the art may have a better understanding.

Figure 1:
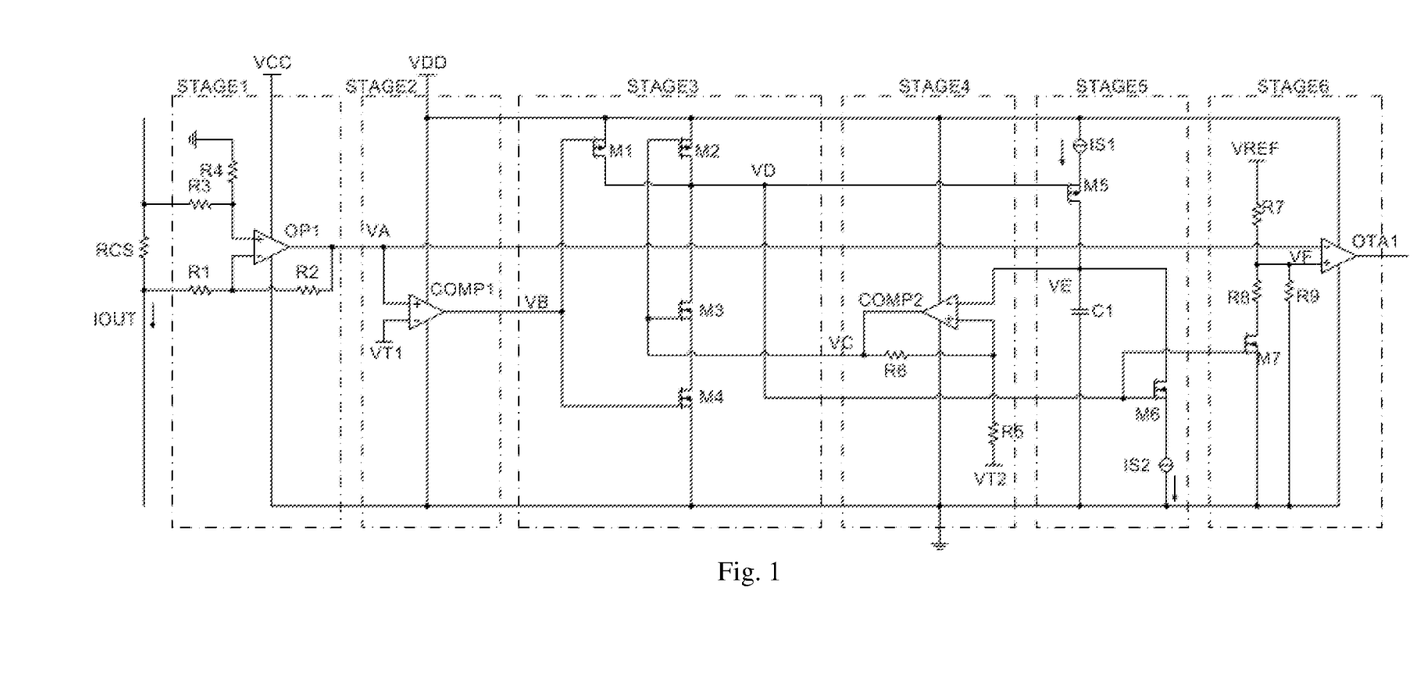
FIG. 1 shows a circuit diagram of a current limit control circuit according to an embodiment of the present invention.

In an embodiment of the present invention, there is provided a current limit control circuit, which, as shown in FIG. 1, includes an output current sampling module STAGE1, a first voltage comparator module STAGE2, a hysteresis comparator module STAGE4, a logic control module STAGE3, a capacitor charging/discharging module STAGE5 and a current limit control module STAGE6. The output current sampling module detects the magnitude of the output current and outputs a corresponding sampled voltage signal. The first voltage comparator module compares the sampled voltage signal with a first reference voltage signal and outputs a first comparison signal. The hysteresis comparator module compares the capacitor's output voltage with upper and lower threshold limits of a hysteresis comparator element and outputs a second comparison signal. The logic control module outputs a logic control signal based on the first and second comparison signals. The capacitor charging/discharging module adjusts the capacitor's output voltage based on the logic control signal. The current limit control module outputs a current limit control signal based on the logic control signal.

When the capacitor's output voltage is lower than the lower threshold limit of the hysteresis comparator element, and if the sampled voltage signal is higher than the first reference voltage signal, the capacitor is charged to a higher output voltage, and the output current limit control signal allows the output current to be high. When the capacitor's output voltage is further raised to a level lower than the hysteresis comparator element's upper threshold limit but higher than its lower threshold limit, and if the sampled voltage signal is higher than the first reference voltage signal, the capacitor is charged to an even higher output voltage, and the current limit control signal still allows the output current to be high. However, upon the capacitor's output voltage rising beyond the upper threshold limit of the hysteresis comparator element, the capacitor starts being discharged, lowering the capacitor's output voltage. Consequently, the current limit control signal allows the output current to transition to a low level. When the capacitor's output voltage drops back to a level lower than the hysteresis comparator element's upper threshold limit and higher than its lower threshold limit, the capacitor remains being discharged, further lowering the capacitor's output voltage. As a result, the current limit control signal still allows the output current to be low.

A particular example of the output current sampling module STAGE1 includes a resistor R1, a resistor R2, a resistor R3, a resistor R4 and an operational amplifier OP1. A positive power supply terminal of the operational amplifier OP1 is coupled to a power supply voltage VCC, and a negative power supply terminal of the operational amplifier OP1 is grounded. One end of the resistor R1 serves as a second current sampling pin and is coupled to one end of a current sampling resistor RCS, and the other end of the resistor R1 is coupled to both one end of the resistor R2 and an inverting input terminal of the operational amplifier OP1. One of the resistor R4 is grounded, while the other end of the resistor R4 is coupled to both one end of the resistor R3 and a non-inverting input terminal of the operational amplifier OP1. The other end of the resistor R3 serves as a first current sampling pin and is coupled to the other end of the current sampling resistor RCS, and an output terminal of the operational amplifier OP1 is coupled to the other end of the resistor R2 and serves as an output terminal VA of the output current sampling module.

The operational amplifier OP1 and the resistors R1, R2, R3, R4 make up a differential amplifier circuit, where R1=R3, and R2=R4. An output voltage of the differential amplifier is given by $$VA = VRCS * \frac{R2}{R1},$$

and this differential signal is converted to a voltage signal relative to a reference ground for subsequent use.

Figure 2:
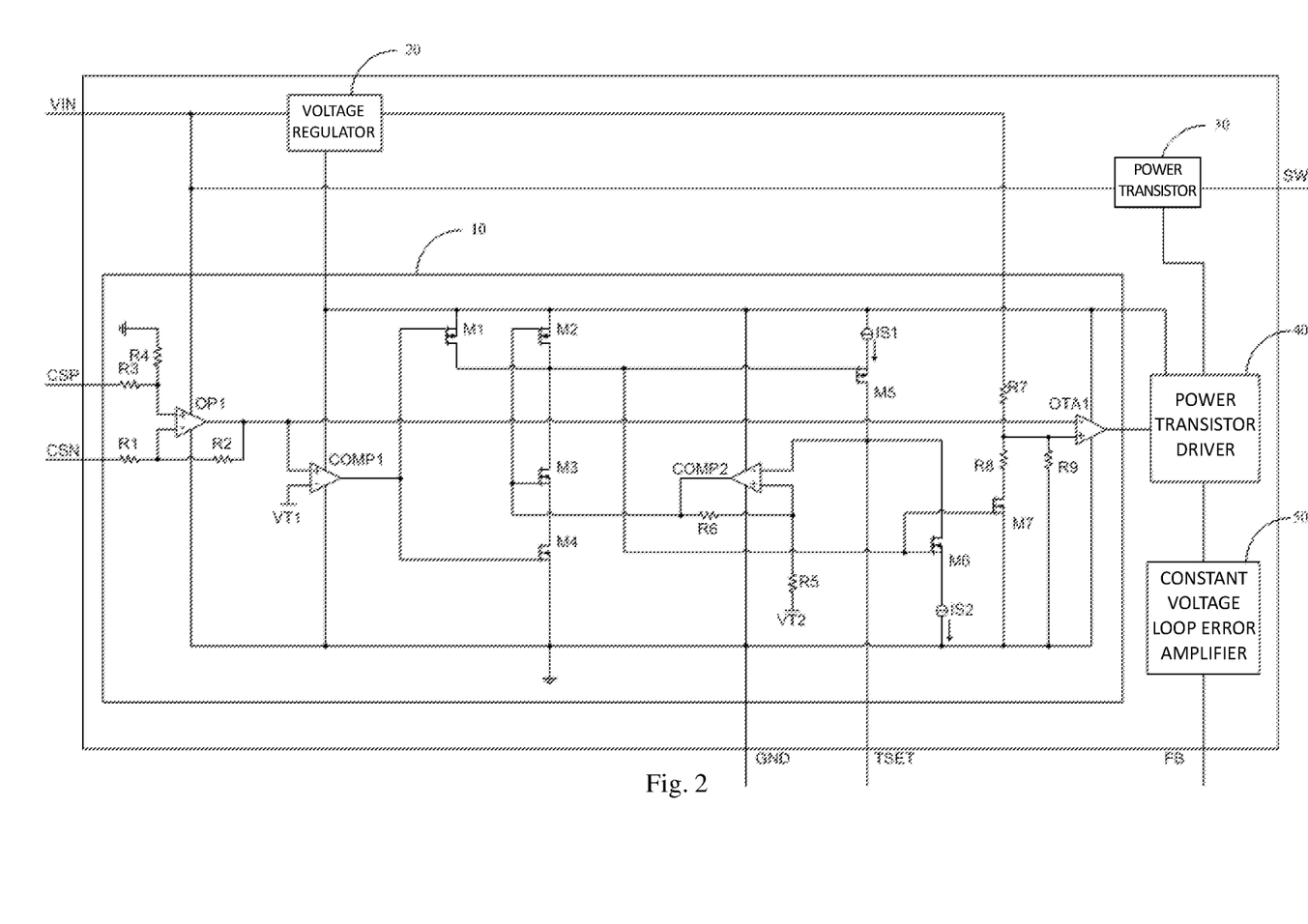
FIG. 2 is a structural schematic of a switched-mode power supply chip according to an embodiment of the present invention.
Figure 3:
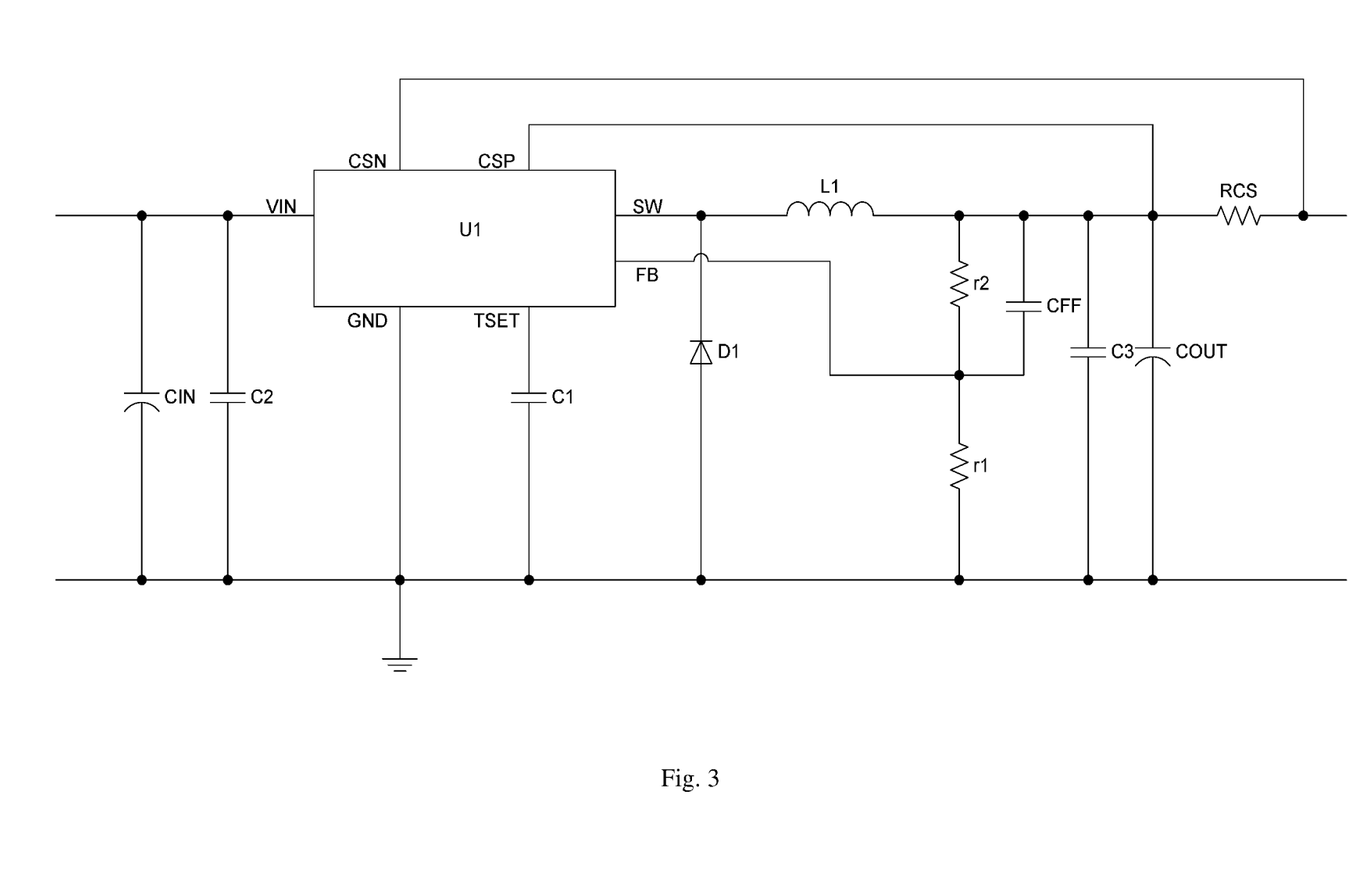
FIG. 3 shows a circuit diagram of a system incorporating the current limit control circuit according to an embodiment of the present invention.

Referring to FIGS. 2 and 3, the first current sampling pin CSP is coupled to one end of the current sampling resistor RCS that is disposed in an external circuit outside the chip, and the second current sampling pin CSN is coupled to the other end of the current sampling resistor RCS.

In other embodiments, the current sampling resistor RCS may be alternatively disposed inside the chip in order to sample the current IOUT (i.e., the output current for the load), and a voltage across RCS is given by VRCS=IOUT*RCS.

A particular example of the first voltage comparator module STAGE2 is a first comparator having an inverting input terminal receiving the first reference voltage signal VT1 and a non-inverting input terminal coupled to the output terminal VA of the output current sampling module. A positive power supply terminal of the first comparator COMP1 is coupled to an operating voltage VDD, and a negative power supply terminal of the first comparator COMP1 is grounded. An output terminal of the first comparator COMP1 serves as an output terminal VB of the first voltage comparator module. The first reference voltage signal VT1 is a low/high current threshold voltage signal. If a voltage at the output terminal VA of the output current sampling module is higher than the low/high current threshold voltage signal, then it is indicated that a high current is required to be output from the output terminal, and a high level is responsively output from the output terminal VB of the first voltage comparator module. If the voltage at the output terminal VA of the output current sampling module is lower than the low/high current threshold voltage signal, then it is indicated that a high current is not required to be output from the output terminal, and a low level is responsively output from the output terminal VB of the first voltage comparator module.

A particular example of the logic control module STAGE3 is a NAND gate having a first input terminal coupled to the output terminal VB of the first voltage comparator module and having a second input terminal coupled to the output terminal VC of the hysteresis comparator module. An output terminal of the NAND gate serves as an output terminal VD of the logic control module. VD outputs a low level only when both VB and VC are high. Under any other condition, VD outputs a high level.

In this embodiment, the NAND gate includes a PMOS transistor M1, a PMOS transistor M2, an NMOS transistor M3 and an NMOS transistor M4. Sources of the PMOS transistor M1 and the PMOS transistor M2 are both coupled to the operating voltage VDD, drains of the PMOS transistor M1, the PMOS transistor M2 and the NMOS transistor M3 are coupled together and serve as the output terminal VD of the logic control module. Gates of the PMOS transistor M1 and the NMOS transistor M4 are coupled together and serve as the first input terminal of the NAND gate. A source of the NMOS transistor M4 is grounded, and a drain of the NMOS transistor M4 is coupled to a source of the NMOS transistor M3. Gates of the NMOS transistor M3 and the PMOS transistor M2 are coupled together and serve as the second input terminal of the NAND gate.

A particular example of the hysteresis comparator module STAGE4 includes a second comparator COMP2, a resistor R5 and a resistor R6. An inverting input terminal of the second comparator COMP2 is coupled to an output terminal VE of the capacitor charging/discharging module, and a non-inverting input terminal of the second comparator COMP2 is coupled both to one end of the resistor R5 and one end of the resistor R6. The other end of the resistor R5 is coupled to a second reference voltage terminal VT2, and the other end of the resistor R6 and an output terminal of the second comparator COMP2 are coupled together and serve as the output terminal VC of the hysteresis comparator module. A positive power supply terminal of the second comparator COMP2 is coupled to the operating voltage VDD, and a negative power supply terminal of the second comparator COMP2 is grounded.

In this embodiment, the second comparator COMP2 may be implemented as a rail-to-rail output comparator (i.e., with a maximum output voltage of VDD and a minimum output voltage of 0 V), and the upper and lower threshold limits of the hysteresis comparator element (VTH1 and VTH2, where VTH1>VTH2) are given by:

$$VTH1 = VDD * \frac{R5}{R5 + R6} + VT2 * \frac{R6}{R5 + R6}$$

$$VTH2 = 0V * \frac{R5}{R5 + R6} + VT2 * \frac{R6}{R5 + R6}.$$

If a voltage VE at the output terminal VE of the capacitor charging/discharging module is higher than VTH1, a voltage VC output from the output terminal VC of the hysteresis comparator module is a low level. If the voltage VE is lower than VTH2, the voltage VC is a high level. If the voltage VE lies between VTH1 and VTH2, VC is maintained at the same level. That is, if VC was originally high, then it is now also high; and if VC was originally low, it is now also low.

A particular example of the capacitor charging/discharging module STAGE5 includes a first current source IS1, a second current source IS2, a PMOS transistor M5, a NMOS transistor M6 and a capacitor C1. An input terminal of the first current source IS1 is coupled to the operating voltage VDD, and an output terminal of the first current source IS1 is coupled to a source of the PMOS transistor M5. A gate of the PMOS transistor M5 is coupled to the output terminal VD of the logic control module, and a drain of the PMOS transistor M5, one end of the capacitor C1 and a drain of the NMOS transistor M6 are coupled together and serve as the output terminal VE of the capacitor charging/discharging module. The other end of the capacitor C1 is grounded, and a source of the NMOS transistor M6 is coupled to an input terminal of the second current source IS2. An output terminal of the second current source IS2 is grounded, and a gate of the NMOS transistor M6 is coupled to the output terminal VD of the logic control module.

The capacitor C1 may be arranged either inside the chip, or as shown in FIGS. 2 and 3, outside the chip. The latter case is more favorable to the adjustment of a period of time in which the high current is allowed to be output.

A particular example of the current limit control module STAGE6 is implemented as an error amplifier including a resistor R7, a resistor R8, a resistor R9, a transconductance amplifier OTA1 and a NMOS transistor M7. One end of the resistor R7 is coupled to an internal reference voltage VREF, and the other end of the resistor R7 is coupled to one end of the resistor R8 and one end of the resistor R9 and serve as a non-inverting input terminal of the transconductance amplifier OTA1. The other end of the resistor R8 is coupled to a drain of the NMOS transistor M7, and a source of the NMOS transistor M7 and the other end of the resistor R9 are both grounded. A gate of the NMOS transistor M7 is coupled to the output terminal VD of the logic control module, and the output terminal VA of the output current sampling module serves as an inverting input terminal of the transconductance amplifier OTA1. A positive power supply terminal of the transconductance amplifier OTA1 is coupled to the operating voltage VDD, and a negative power supply terminal of the transconductance amplifier OTA1 is grounded. An output terminal of the transconductance amplifier OTA1 serves as the output terminal of the current limit control module.

A difference between a voltage VA at the output terminal VA of the output current sampling module and a voltage VF at the non-inverting input terminal of the transconductance amplifier OTA1 is amplified by the transconductance amplifier OTA1 and fed to the next stage, where it undergoes frequency compensation and is then provided to a latched driver for turning on or off a power transistor and thus controlling the magnitude of the output current IOUT.

Assuming the NMOS transistor M7 has an on-resistance NMOS transistor Rdson, when the NMOS transistor M7 is off, the voltage VF present on the non-inverting input terminal of the transconductance amplifier OTA1 is given by $$VF1 = VREF * \frac{R9}{R7 + R9}.$$

When the NMOS transistor M7 is on, the voltage VF present on the non-inverting input terminal of the transconductance amplifier OTA1 is given by $$VF2 = VREF * \frac{R9||(R8 + Rdson)}{R9||(R8 + Rdson) + R7},$$

where "||" represents parallel connection. As can be seen, when the NMOS transistor M7 is off, the transconductance amplifier OTA1 provides a reference voltage of VF1, and when the NMOS transistor M7 is on, the transconductance amplifier OTA1 provides a reference voltage of VF2, where VF2<VF1.

In stable operation of the system without a current limit being triggered, the voltages at the non-inverting and inverting input terminals may be considered equal to each other, i.e., VA=VF.

So, we have

VA=IOUT$_{MAX}$*RCS*R2/R1=VF.

In this case, a maximum permissible output current IOUT$_{MAX}$ is $$IOUT_{MAX} = \frac{VF * R1}{RCS * R2}.$$

As can be seen, this maximum permissible output current varies with VF.

A detailed description of the principles of the present invention will be set forth below.

When the output current is detected to be high, the logic control module changes the capacitor's output voltage through performing charge/discharge control on the capacitor, and upon receiving feedback of the completion of the capacitor's charge/discharge from the hysteresis comparator module, the output of the logic control module allows the switched-mode power supply to output a high current for a specified period of time. Moreover, the output of the logic control module controls the NMOS transistor M7 to be turned on or off, thus causing the voltage VF at the non-inverting input terminal of the transconductance amplifier OTA1 to be high or low and adjusting the magnitude of IOUT$_{MAX}$.

Thus, in response to the detection of a high current, the logic control module performs control to charge/discharge the capacitor to start a timer to count down a period of time that the high current is allowed, and simultaneously to turn on/off the NMOS transistor M7 to set a limit for the current, i.e., the highest allowable value of the current.

In a first specific case (Case 1), the capacitor C1 is charged to VTH1 and discharged to below VTH2. When IOUT*RCS*R2/R1>VT1, the output terminal VB of the first voltage comparator module outputs a high level. Initially, the capacitor's output voltage VE is 0V, lower than VTH2, so the voltage at the output terminal VC of the hysteresis comparator module is high. Since the output VB of the first voltage comparator module that is coupled to the first input terminal of the NAND gate and the output VC of the hysteresis comparator module that is coupled to the second input terminal of the NAND gate are both high, a low level is output from the output terminal VD of the logic control module and turns the PMOS transistor M5 on. Moreover, since the output VD of the logic control module is coupled to the gates of the NMOS transistors M6 and M7, the two NMOS transistors are turned off.

As a result of the PMOS transistor M5 being turned on by the low level output from the output terminal VD of the logic control module, the first current source IS1 charges the capacitor C1 via the PMOS transistor M5. The capacitor's output voltage VE at the output terminal VE of the capacitor charging/discharging module is given by $$VE(t) = \frac{1}{C1}\int_{t0}^{t} IS1 * dt + VE_0 = \frac{IS1 * (t - t0)}{C1} + VE_0,$$

where VE$_0$ represents an initial value of the voltage VE prior to the charge (VE$_0$ is the voltage value at the end of the last cycle and is 0V in ideal cases), t0 is the time when the charge begins, VE(t) is a voltage value of the capacitor at the time t, C1 is the capacitance of the capacitor C1. When the charge current IS1 provided by the first current source IS1 is constant, VE(t) rises at a fixed slope.

When the voltage VE rises into the range of VTH2–VTH1, due to the hysteretic nature of the hysteresis comparator module, the voltage at the output terminal VC remains the same as the previous high level, so before the voltage VE reaches VTH1, the voltage VC is always high, with the output VD of the logic control module being low. Therefore, the PMOS transistor M5 is always on, allowing the voltage VE to rise up to VTH1. Throughout this process, the voltage VD is low, and the PMOS transistor M7 is off. As a result, the reference voltage provided at the non-inverting input terminal VF of the transconductance amplifier OTA1 is high (VF1), allowing the power transistor to output a high current for a period of time tc that is given by $$tc = \frac{C1 * (VTH1 - VE_0)}{IS1}.$$

As can be seen, the length of this period of time can be changed through adjusting the capacitor C1, the first current source IS1 and the upper voltage limit VTH1 of the hysteresis comparator element.

Upon the voltage VE reaching VTH1, the output terminal VC of the hysteresis comparator module starts outputting a low level. As the output terminal VB of the first voltage comparator module is coupled to the first input terminal of the NAND gate and the output terminal VC of the hysteresis comparator module is coupled to the second input terminal of the NAND gate, at the low-level voltage VC, the voltage VD is certainly high regardless whether VB is high or low. As a result, the PMOS transistor M5 is off, and because the output terminal of the logic control module is coupled to the gates of the NMOS transistors M6 and M7, the two NMOS transistors M6 and M7 are turned on, causing the non-inverting input terminal VF of the transconductance amplifier OTA1 to provide the low reference voltage VF2 and thus not disallowing a high current to be output. Consequently, the capacitor C1 is discharged via the NMOS transistor M6 and the second current source IS2 at a current IS2, and the voltage on the capacitor C1 changes as described by $$VE(t) = \frac{1}{C1}\int_{t0}^{t}(-IS2) * dt + VE_1 = -\frac{(t - t1) * IS2}{C1} + VTH1$$

where VE(t) represents the value of the voltage at the output terminal VE of the capacitor charging/discharging module at the time t, C1 is the capacitance of the capacitor C1, t1 is the time when the discharge begins, and VE$_1$ is an initial value of the voltage at the output terminal VE of the capacitor charging/discharging module. As the output VE of the capacitor charging/discharging module decreases from VTH1, VE$_1$=VTH1. When the current IS2 is constant, the VE(t) drops at a fixed slope.

When the voltage VE decreases into the range of VTH2–VTH1, the voltage VC remains the same as the previous low level, so before the voltage VE drops to VTH2, the voltage VC is always low, with the voltage VD being high. Therefore, the NMOS transistor M6 is always on, allowing the voltage VE to drop up to VTH2 or even 0V. Throughout this process, the voltage VD is high, and the NMOS transistor M7 is on. As a result, the reference voltage provided at the non-inverting input terminal VF of the transconductance amplifier OTA1 is low (VF2), also disallowing the output of a high current. This process lasts for a period of time td given by $$td = \frac{C1(VTH1 - VTH2)}{IS2}.$$

After the voltage VE drops to VTH2, the voltage VC is again pulled high. At this point, if the output current is low, then the voltage VB is low, and the capacitor is not charged. Otherwise, if the output current is high, the above current limiting process will be repeated.

Figure 4:
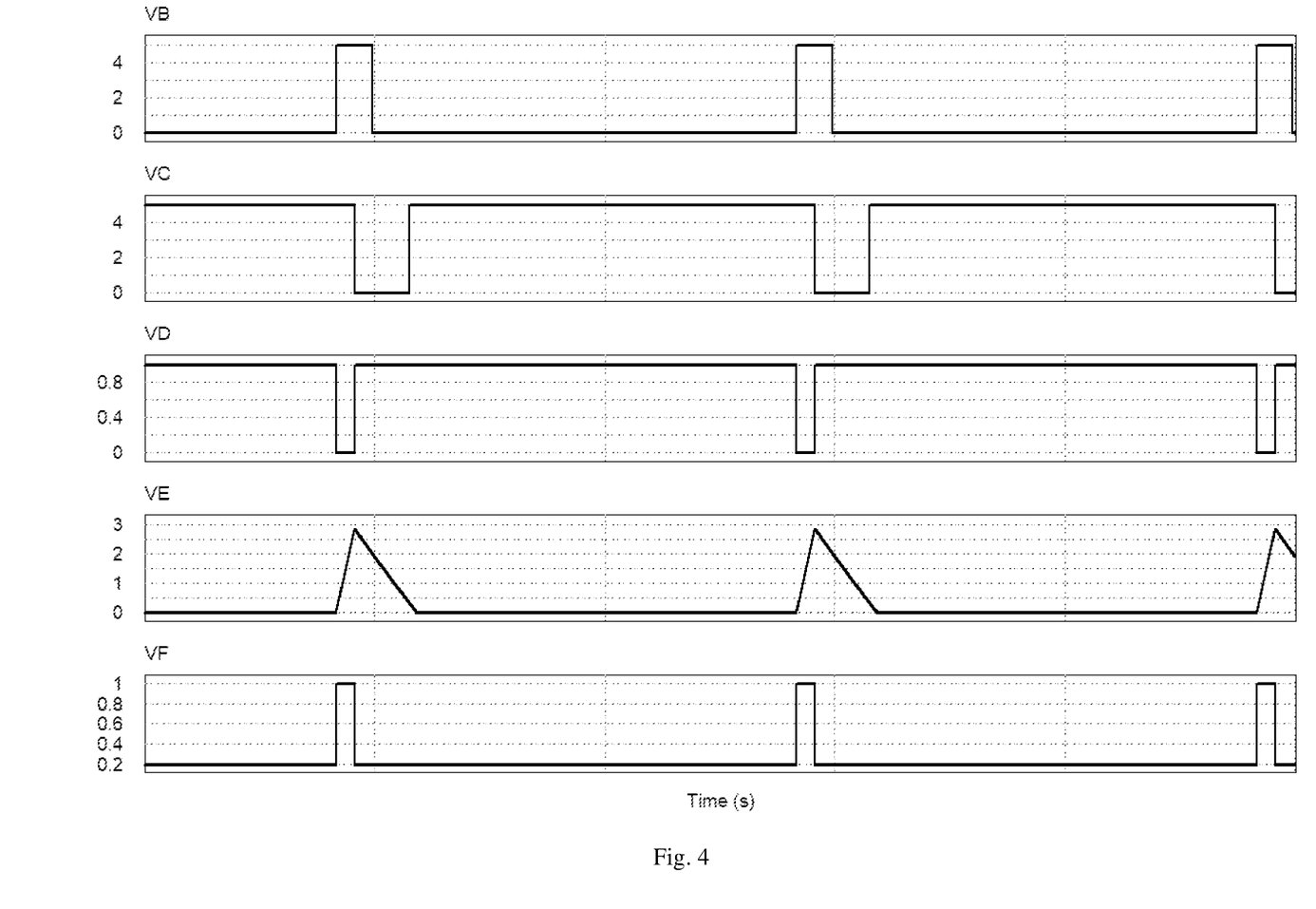
FIG. 4 depicts waveforms of voltages, showing their responsive behavior at some critical time points in the event of a length of time that a high current is desired to last for being longer than a maximum permissible length, according to an embodiment of the present invention.

In this embodiment, waveforms of the voltages are shown in FIG. 4, which shows responsive behavior of the voltages at some critical time points in the event of a length of time that a high current lasts for being longer than the maximum permissible length. In this figure, the high level pulse width of VB represents a length of time that the high current is desired to last for; VC, the output voltage of the hysteresis comparator module; VD, the output voltage of the logic control module; VE, the output voltage of the capacitor C1; and VF, the voltage at the non-inverting input terminal of the transconductance amplifier OTA1.

As can be seen from FIG. 4, at the time when the voltage VB transitions from low to high, the voltage VE is 0V, lower than VTH1, and the voltage VC is therefore high. Under the action of the NAND gate, the voltage VD is low, causing the first current source IS1 to charge the capacitor C1. As a result, the voltage VE rises at a fixed slope. At this point, as the NMOS transistor M7 is not turned on, the voltage VF is high (1V as shown) and the output current is high. Upon the voltage VE rising to VTH1, the voltage VC drops low, raising the voltage VD high. As a result, the second current source IS2 starts discharging the capacitor C1, and the output voltage VE of the capacitor starts decreasing at a fixed slope. At the same time, the NMOS transistor M7 is turned on, lowering VF and the output current and ensuring safe operation of the chip. As the time length that the high current is desired to lasts for is longer than the maximum permissible length, the pulse width of the voltage VB is greater than that of the voltage VF. Moreover, with the output current of the system decreasing to a certain level at a later time, the voltage VB transitions from high to low, causing the capacitor charging/discharging module to further discharge the capacitor C1 until its voltage becomes 0V.

In a second specific case (Case 2), the capacitor C1 stops being charged as soon as a desired high current is achieved before the voltage reaches VTH1, and is then discharged below VTH2.

This case corresponds to application where a time length that a high current is desired to last for is shorter than the aforementioned period tc, i.e., shorter than a preset maximum allowable length, while a desired low current period is much longer than the aforementioned period td. The waveforms of the voltages demonstrating their behavior at critical time points in this case are shown in FIG. 5.

Figure 5:
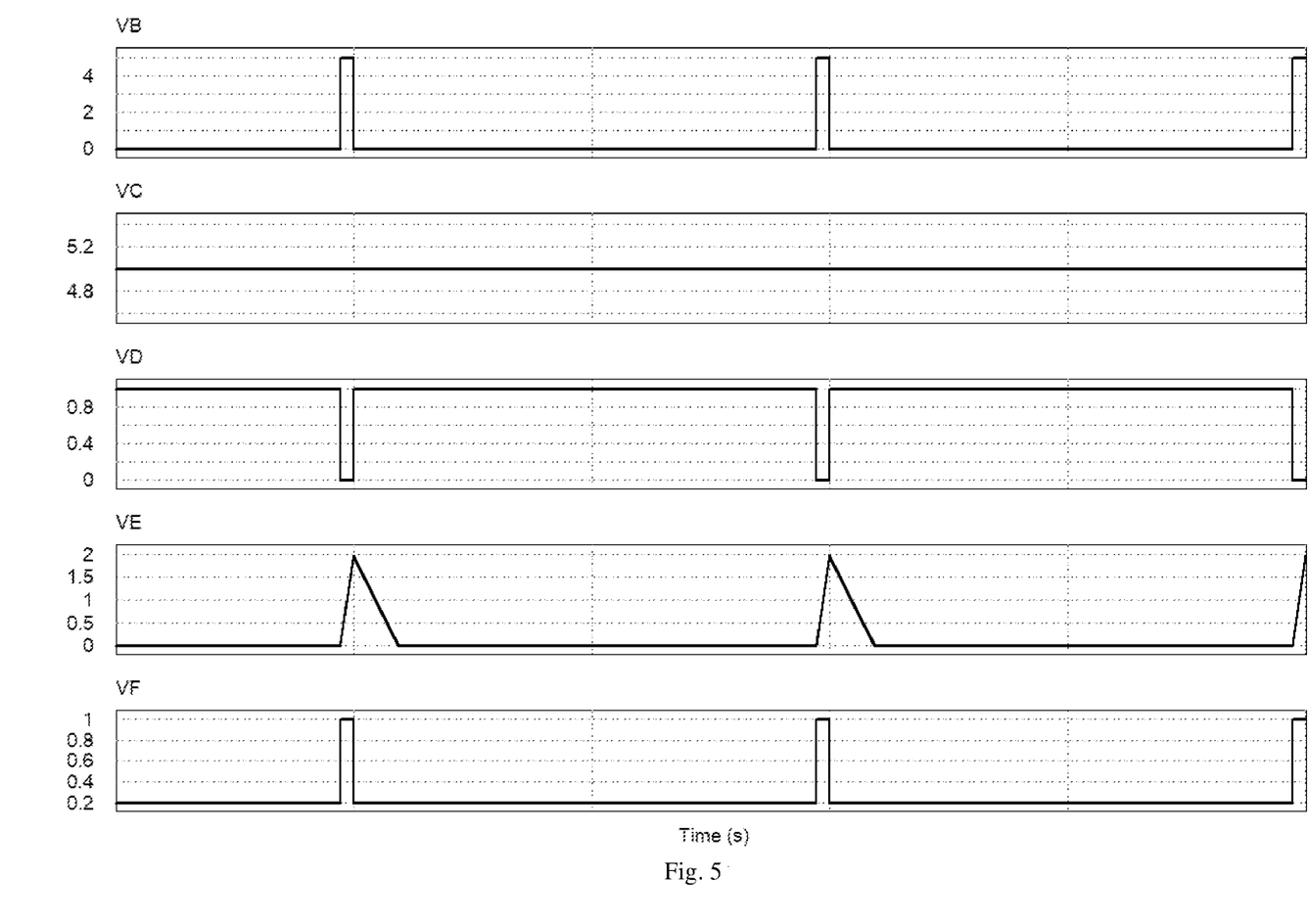
FIG. 5 depicts waveforms of voltages, showing their responsive behavior at some critical time points in the event of a length of time that a high current is desired to last for being shorter than a maximum permissible length, according to an embodiment of the present invention.

As can be seen from FIG. 5, at the time when the voltage VB transitions from low to high, the voltage VE is 0V, lower than VTH1, and the voltage VC is therefore high. Under the action of the NAND gate, the voltage VD is low, causing the first current source IS1 to charge the capacitor C1. As a result, the voltage VE rises at a fixed slope. At this point, as the NMOS transistor M7 is not turned on, the voltage VF is high. As the desired high current duration is shorter than the preset maximum allowable time length, the voltage VB drops to 0V before the voltage VE reaches VTH1, indicating that the system is no longer needed to output the high current. Although the voltage VC is high, as the voltage VD has been raised high, the second current source IS2 discharges the capacitor C1, causing the output voltage VE thereof to decrease at a fixed slope. At the same time, the NMOS transistor M7 is turned on, lowering VF (to 0.2V as shown), and a low current is output.

In embodiments of the present invention, there is also provided a switched-mode power supply chip incorporating the current limit control circuit as defined above. Referring FIGS. 2 and 3, the chip includes the current limit control circuit 10, a voltage regulator 20, a power transistor 30, a power transistor driver 40 and a constant voltage loop error amplifier 50. The voltage regulator 20 acquires the power supply voltage VCC and provides the current limit control circuit 10 with the operating voltage VDD and the internal reference voltage VREF. The current limit control circuit 10 samples an output current and outputs a current limit control signal based on the power supply voltage VCC, the operating voltage VDD, the internal reference voltage VREF, the first reference voltage VT1 and the second reference voltage VT2. The constant voltage loop error amplifier 50 acquires a feedback voltage of an output voltage and provides it to the power transistor driver 40. The power transistor driver 40 acquires the current limit control signal and the feedback signal of the output voltage and produces a power transistor drive signal by means of frequency compensation and latched driving. The power transistor 30 switches on or off a power transistor using the power transistor drive signal, thus limiting the magnitude of the output current.

In one embodiment, the switched-mode power supply chip includes VIN, SW, FB, TSET, GND, CSN and CSP pins. The VIN pin is coupled to the power supply voltage VCC and internally to an input of the power transistor 30 and an input of the voltage regulator 20. The SW pin is coupled to an output of the power transistor 30, and the FB pin is coupled to an input of the constant voltage loop error amplifier 50. The TSET pin is coupled to the drain of the PMOS transistor M5 in the chip and to one end of a capacitor outside the chip. The other end of the capacitor is grounded. The CSP pin serves the aforementioned first current sampling pin CSP of the chip, and the CSN pin serves the aforementioned second current sampling pin CSN of the chip.

In this embodiment, referring to FIGS. 2 and 3, the capacitor for the current limit control circuit is arranged outside the chip as a standalone component. This allows easier adjustment of a period of time in which a high current is allowed to be output. In other embodiments, the capacitor for the current limit control circuit may be alternatively integrated in the chip.

In this embodiment, the CSN and CSP pins are respectively coupled to opposing ends of the current sampling resistor RCS that is disposed outside the chip, thus dispensing with the need for modifying the original switched-mode power supply circuit. In other embodiments, the current sampling resistor RCS may be alternatively arranged inside the chip.

Finally, it is to be noted that any and all other embodiments obtained by modifying some or all technical features disclosed in the above embodiments of the present invention or by substituting them with equivalent technical features are not considered to deviate from the technical essence of the respective embodiments of the present invention and considered to fall within the scope of the embodiments of the present invention.

What is claimed is:

1. A current limit control circuit comprising an output current sampling module, a first voltage comparator module, a hysteresis comparator module, a logic control module, a capacitor charging/discharging module and a current limit control module, the output current sampling module configured to detect a magnitude of an output current and output a corresponding sampled voltage signal, the first voltage comparator module configured to compare the sampled voltage signal with a first reference voltage signal and output a first comparison signal, the first reference voltage signal serving as a low/high current threshold voltage signal, the hysteresis comparator module configured to compare an output voltage of a capacitor with upper and lower threshold limits of a hysteresis comparator element and output a second comparison signal, the logic control module configured to output a logic control signal based on the first and second comparison signals, the capacitor charging/discharging module configured to adjust the capacitor's output voltage based on the logic control signal, the current limit control module configured to output a current limit control signal based on the logic control signal, wherein if the capacitor's output voltage is lower than the lower threshold limit of the hysteresis comparator element and if the sampled voltage signal is higher than the first reference voltage signal, the capacitor charging/discharging module charges the capacitor so that the capacitor's output voltage is raised, and the current limit control signal allows a high current to be output, wherein if the capacitor's output voltage further rises to a level lower than the upper threshold limit of the hysteresis comparator element and higher than the lower threshold limit of the hysteresis comparator element and if the sampled voltage signal is higher than the first reference voltage signal, the capacitor continues being charged so that the capacitor's output voltage is further raised and the current limit control signal still allows the high current to be output, wherein if the capacitor's output voltage rises above the upper threshold limit of the hysteresis comparator element, the capacitor is discharged so that the capacitor's output voltage is lowered, and the current limit control signal allows a low current to be output; and if the capacitor's output voltage further drops below the upper threshold limit of the hysteresis comparator element, the capacitor continues being discharged so that the capacitor's output voltage further decreases but is higher than the lower threshold limit of the hysteresis comparator element, and the current limit control signal still allows the low current to be output.

2. The current limit control circuit of claim 1, wherein the output current sampling module comprises a first resistor, a second resistor, a third resistor, a fourth resistor and an operational amplifier, the operational amplifier having a positive power supply terminal coupled to a power supply voltage, the operational amplifier having a negative power supply terminal grounded, one end of the first resistor serving as a second current sampling pin and coupled to one end of a current sampling resistor, the other end of the first resistor coupled to both one end of the second resistor and an inverting input terminal of the operational amplifier, one end of the fourth resistor grounded, the other end of the fourth resistor coupled to both one end of the third resistor and a non-inverting input terminal of the operational amplifier, the other end of the third resistor serving as a first current sampling pin and coupled to the other end of the current sampling resistor, the operational amplifier having an output terminal coupled to the other end of the second resistor and serving as an output terminal of the output current sampling module.

3. The current limit control circuit of claim 1, wherein the first voltage comparator module is implemented as a first comparator, the first comparator having an inverting input terminal coupled to the first reference voltage signal, the first comparator having a non-inverting input terminal implemented as an output terminal of the output current sampling module, the first comparator having a positive power supply terminal coupled to an operating voltage, the first comparator having a negative power supply terminal grounded, the first comparator having an output terminal serving as an output terminal of the first voltage comparator module.

4. The current limit control circuit of claim 1, wherein the logic control module is implemented as a two-input NAND gate, the NAND gate having a first input terminal coupled to an output terminal of the first voltage comparator module, the NAND gate having a second input terminal coupled to an output terminal of the hysteresis comparator module, the NAND gate having an output terminal serving as an output terminal of the logic control module.

5. The current limit control circuit of claim 4, wherein the NAND gate comprises a first PMOS transistor, a second PMOS transistor, a first NMOS transistor and a second NMOS transistor, sources of the first and second PMOS transistors both coupled to an operating voltage, drains of the first PMOS, second PMOS and first NMOS transistors coupled together and serving as the output terminal of the logic control module, gates of the first PMOS and second NMOS transistors coupled together and serving as the first input terminal of the NAND gate, the second NMOS transistor comprising a source grounded, the second NMOS transistor comprising a drain coupled to a source of the first NMOS transistor, gates of the first NMOS and second PMOS transistors coupled together and serving as the second input terminal of the NAND gate.

6. The current limit control circuit of claim 1, wherein the hysteresis comparator module comprises a second comparator, a fifth resistor and a sixth resistor, the second comparator having an inverting input terminal coupled to an output terminal of the capacitor charging/discharging module, the second comparator having a non-inverting input terminal coupled to one end of the fifth resistor and one end of the sixth resistor, the other end of the fifth resistor coupled to a second reference voltage terminal, the other end of the sixth resistor coupled to an output terminal of the second comparator and serving as an output terminal of the hysteresis comparator module, the second comparator having a positive power supply terminal coupled to an operating voltage, the second comparator having a negative power supply terminal grounded.

7. The current limit control circuit of claim 1, wherein the capacitor charging/discharging module comprises a first current source, a second current source, a third PMOS transistor, a third NMOS transistor and the capacitor, the first current source having an input terminal coupled to an operating voltage, the first current source having an output terminal coupled to a source of the third PMOS transistor, the third PMOS transistor having a gate coupled to an output terminal of the logic control module, a drain of the third PMOS transistor, one end of the capacitor and a drain of the third NMOS transistor coupled together and serving as an output terminal of the capacitor charging/discharging module, the other end of the capacitor grounded, the third NMOS transistor having a source coupled to an input terminal of the second current source, the second current source having an output terminal grounded, the third NMOS transistor having a gate coupled to an output terminal of the logic control module.

8. The current limit control circuit of claim 1, wherein the current limit control module is implemented as an error amplifier comprising a seventh resistor, an eighth resistor, a ninth resistor, a transconductance amplifier and a fourth NMOS transistor, one end of the seventh resistor coupled to an internal reference voltage, the other end of the seventh resistor, one end of the eighth resistor and one end of the ninth resistor coupled together and serving as a non-inverting input terminal of the transconductance amplifier, the other end of the eighth resistor coupled to a drain of the fourth NMOS transistor, both a source of the fourth NMOS transistor and the other end of the ninth resistor grounded, the fourth NMOS transistor comprising a gate coupled to an output terminal of the logic control module, the transconductance amplifier having an inverting input terminal implemented as an output terminal of the output current sampling module, the transconductance amplifier having a positive power supply terminal coupled to an operating voltage, the transconductance amplifier having a grounded negative power supply terminal, the transconductance amplifier having an output terminal serving as an output terminal of the current limit control module.

9. A switched-mode power supply chip comprising the current limit control circuit of claim 1, a voltage regulator, a power transistor and a power transistor driver, the voltage regulator configured to acquire a power supply voltage and then provide the current limit control circuit with an operating voltage and an internal reference voltage, the current limit control circuit configured to sample an output current and output the current limit control signal based on the power supply voltage, the operating voltage, the internal reference voltage, the first reference voltage signal and a second reference voltage signal, the power transistor driver configured to acquire the current limit control signal and a feedback signal of the output voltage and produce a power transistor drive signal by means of frequency compensation and latched driving, the power transistor configured to turn on or off the power transistor based on the power transistor drive signal and thus limit a magnitude of the output current.

10. The switched-mode power supply chip of claim 9, wherein the capacitor in the current limit control circuit is disposed outside the chip.

* * * * *